(12) United States Patent
Campbell et al.

(10) Patent No.: US 6,412,811 B1
(45) Date of Patent: *Jul. 2, 2002

(54) INFLATOR

(75) Inventors: Douglas P. Campbell, Metamora, MI (US); Ahmad K. Al-Amin, Higley, AZ (US); Timothy A. Swann; Roy D. Van Wynsberghe, both of Mesa, AZ (US); Jess A. Cuevas, Scottsdale, AZ (US); Dean M. Esterberg, Tempe, AZ (US); Bryan W. Shirk, Mesa, AZ (US)

(73) Assignees: TRW Inc.; TRW Vehicle Safety Systems Inc., both of Lyndhurst, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/589,341

(22) Filed: Jun. 7, 2000

Related U.S. Application Data

(63) Continuation-in-part of application No. 09/259,362, filed on Feb. 26, 1999, now Pat. No. 6,227,562, and a continuation-in-part of application No. 09/371,776, filed on Aug. 10, 1999.

(51) Int. Cl.[7] .......................... B60R 21/22; B60R 21/26
(52) U.S. Cl. ................. 280/730.2; 280/737; 137/68.13; 137/71
(58) Field of Search .................. 280/737, 736, 280/741, 730.2; 137/68.13, 71

(56) References Cited

U.S. PATENT DOCUMENTS

| | | | |
|---|---|---|---|
| 3,680,886 A | * 8/1972 | Mazelsky | .................... 280/740 |
| 3,773,351 A | * 11/1973 | Catanzarite | .................. 280/738 |
| 5,573,271 A | 11/1996 | Headley | |
| 5,603,525 A | 2/1997 | Zakula | |
| 5,709,406 A | * 1/1998 | Buchanan | .................... 280/737 |
| 5,794,973 A | * 8/1998 | O'Loughlin et al. | ......... 280/737 |
| 5,967,550 A | * 10/1999 | Shirk et al. | .................. 280/736 |
| 6,010,152 A | * 1/2000 | Swann et al. | ............... 280/736 |
| 6,010,153 A | 1/2000 | Halas et al. | |
| 6,029,995 A | 2/2000 | Fink | |
| 6,056,316 A | * 5/2000 | Yamaji et al. | ........... 280/730.2 |
| 6,062,599 A | 5/2000 | Forbes et al. | |
| 6,145,876 A | * 11/2000 | Hamilton et al. | ........... 280/737 |

FOREIGN PATENT DOCUMENTS

| | | |
|---|---|---|
| GB | 2314300 | 12/1997 |
| JP | 10157551 | 6/1998 |
| JP | 10230814 | 9/1998 |

* cited by examiner

Primary Examiner—Peter C. English
(74) Attorney, Agent, or Firm—Tarolli, Sundheim, Covell, Tummino & Szabo L.L.P.

(57) ABSTRACT

An apparatus (10) for helping to protect an occupant of a vehicle (12) that has a side structure (16) includes an inflatable vehicle occupant protection device (14). The inflatable vehicle occupant protection device (14) is inflatable into a position between the side structure of the vehicle and a vehicle occupant. The apparatus (10) includes an inflator (22) for inflating the inflatable vehicle occupant protection device (14) and for maintaining the inflatable vehicle occupant protection device in an inflated condition for at least five seconds. The inflator (22) contains a stored inflation fluid under pressure. The inflation fluid consists essentially of helium.

23 Claims, 6 Drawing Sheets

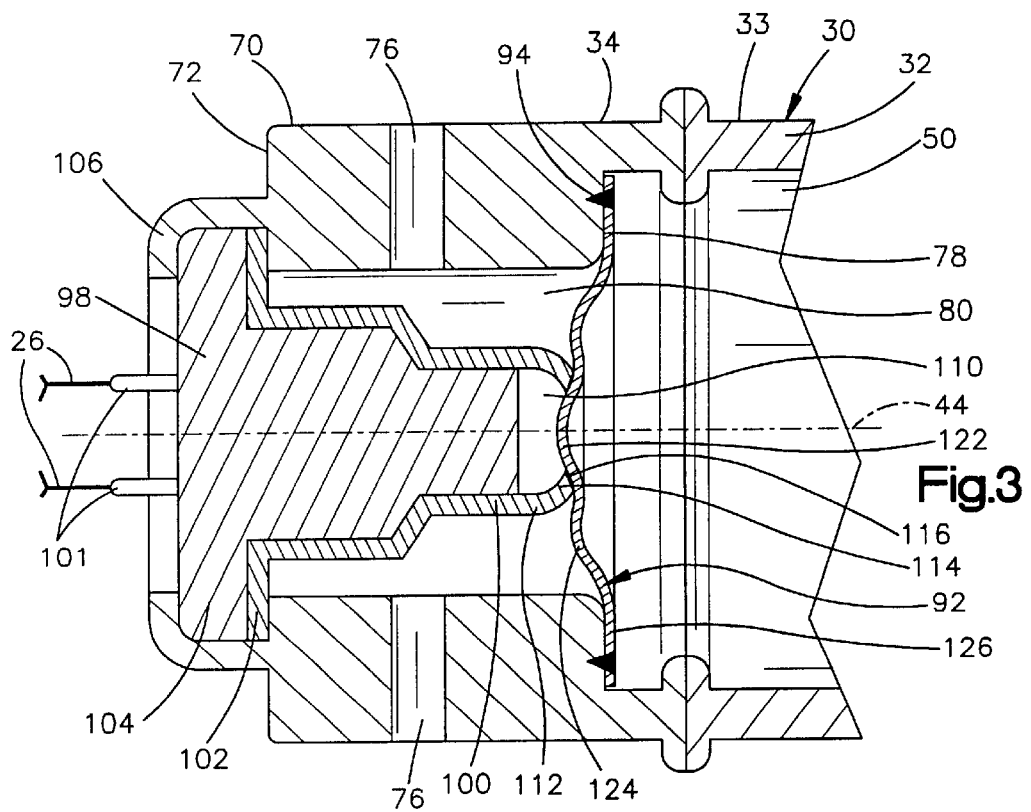
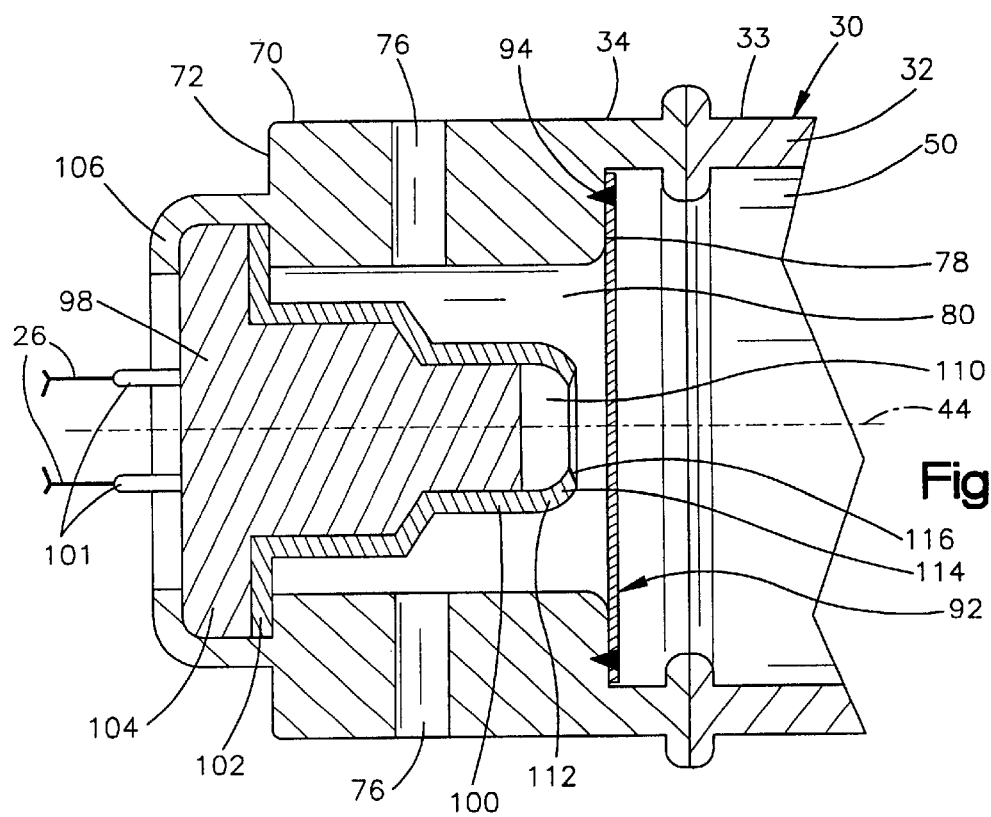

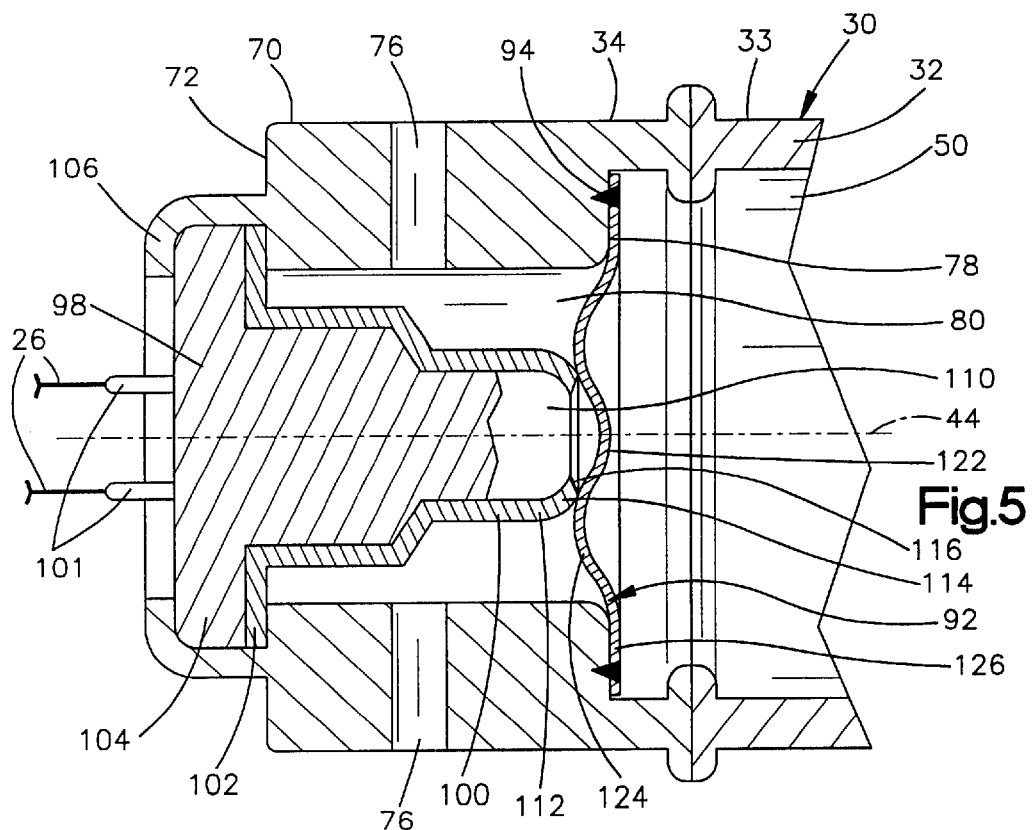
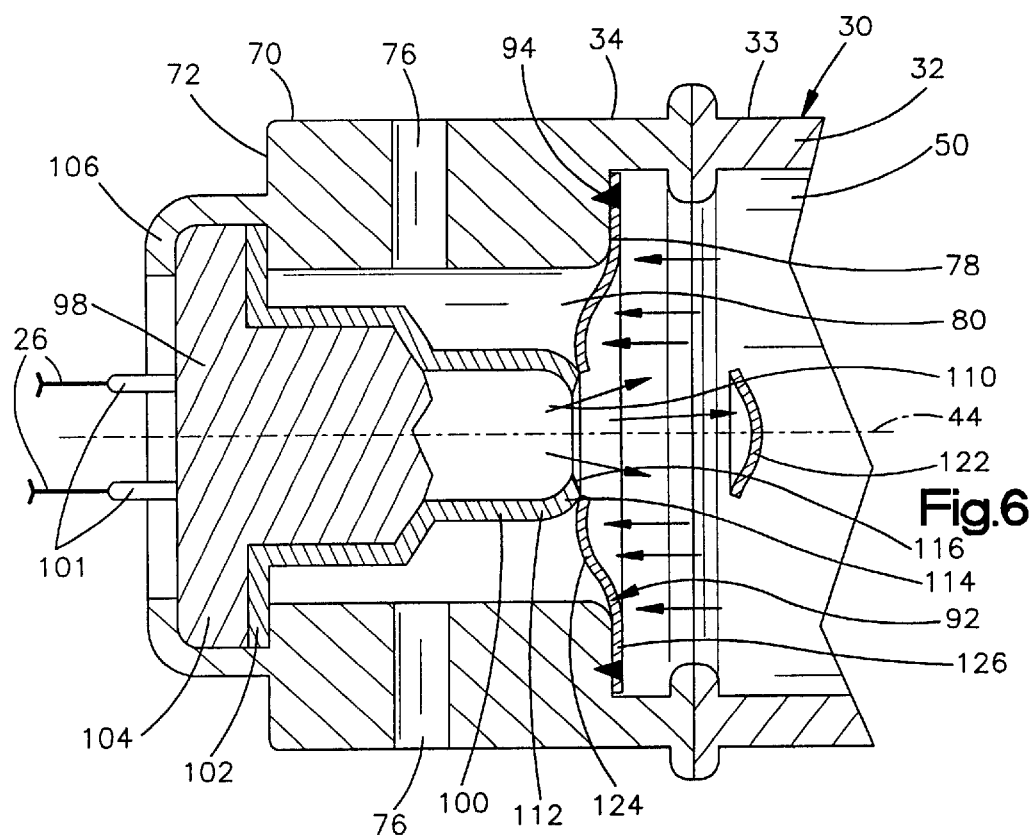

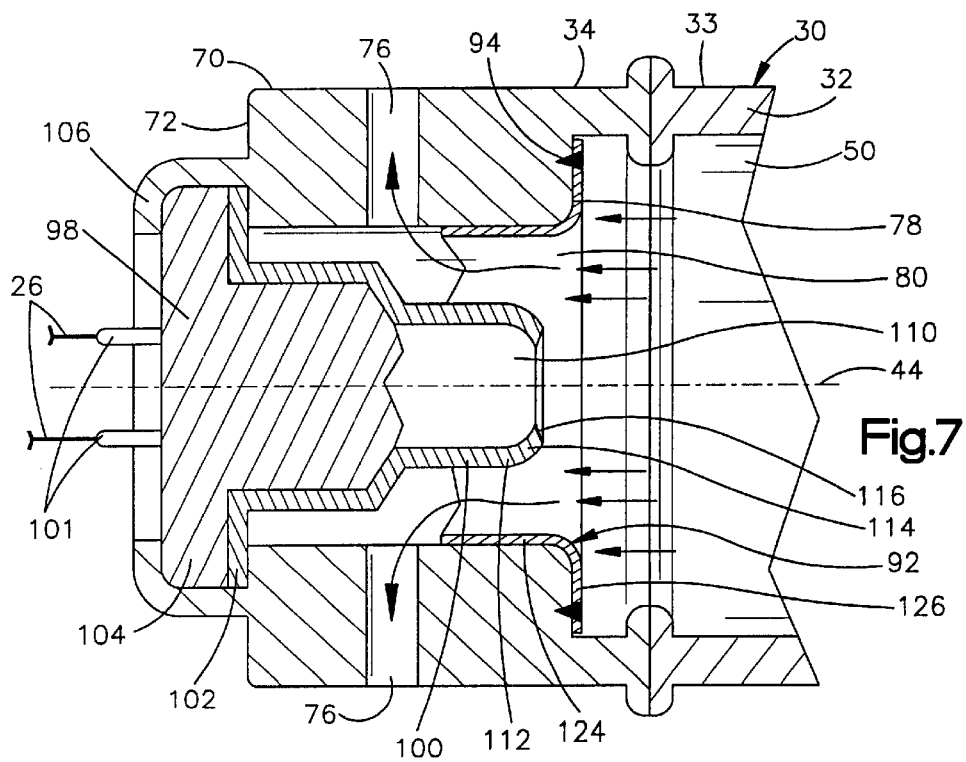
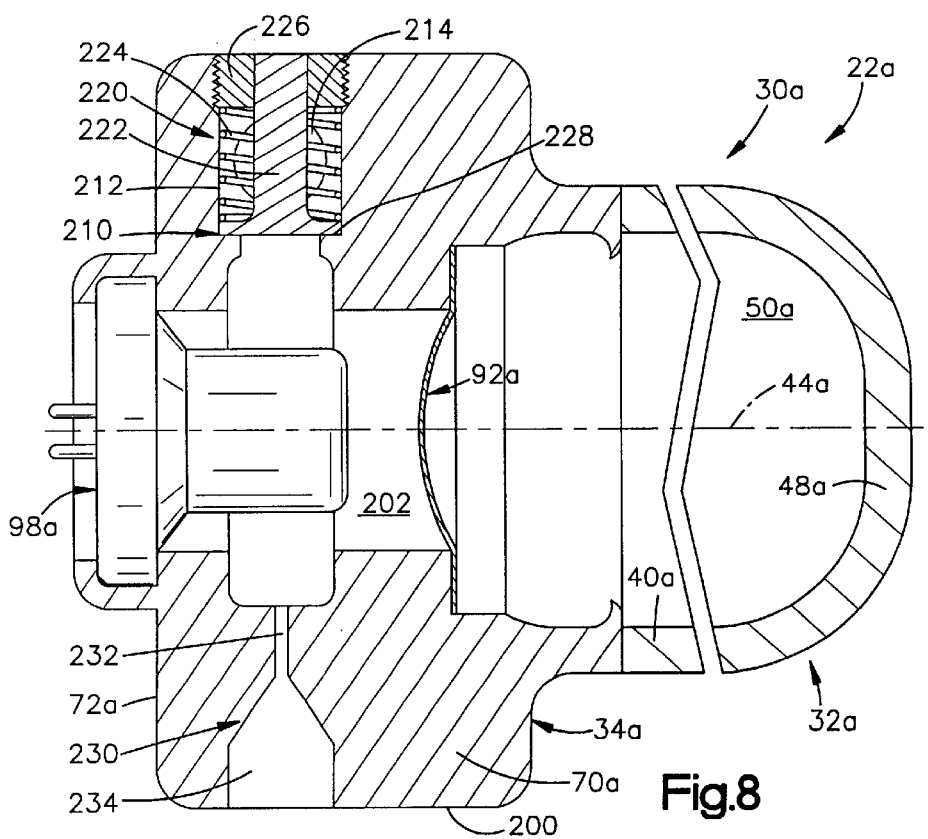

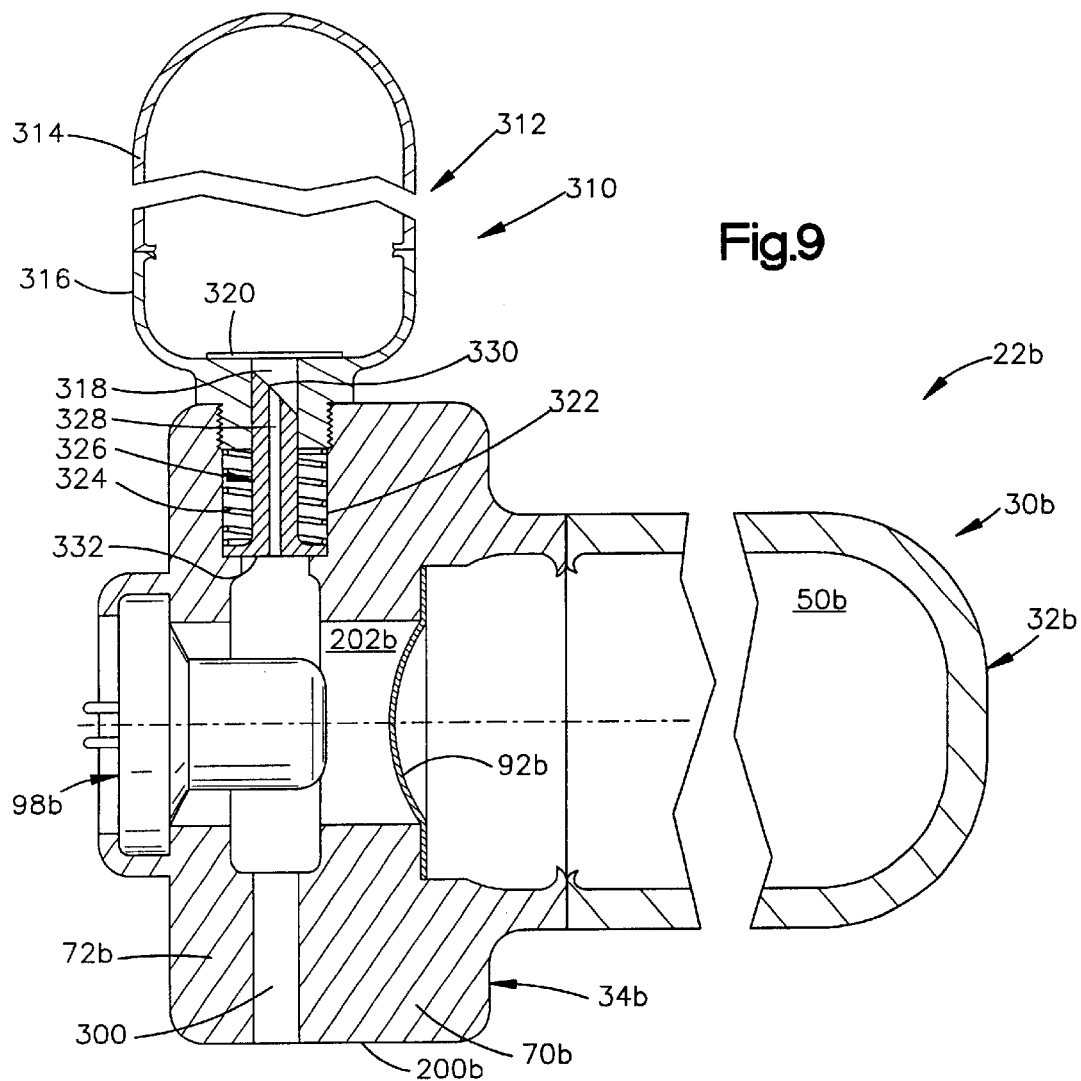

INFLATOR

CROSS REFERENCE TO RELATED APPLICATIONS

This application is a continuation-in-part of U.S. application Ser. No. 09/259,362, which was filed on Feb. 26, 1999, U.S. Pat. No. 6,227,562, and U.S. application Ser. No. 09/371,776, which was filed on Aug. 10, 1999.

FIELD OF THE INVENTION

The present invention relates to an apparatus for helping to protect an occupant of a vehicle and, more specifically, to an inflator that provides inflation fluid to inflate an inflatable vehicle occupant protection device and maintains the inflatable vehicle occupant protection device in an inflated condition for a desired period of time.

BACKGROUND OF THE INVENTION

It is known to inflate an inflatable vehicle occupant protection device to help protect a vehicle occupant in the event of a vehicle collision. One particular type of inflatable vehicle occupant protection device is a side curtain that inflates from the roof of the vehicle downward inside the passenger compartment between a vehicle occupant and the side structure of the vehicle in the event of a side impact or rollover. A known side curtain is inflated from a deflated condition by inflation fluid directed from an inflator to the side curtain through a fill tube.

SUMMARY OF THE INVENTION

The present invention comprises an apparatus for helping to protect an occupant of a vehicle that has a side structure. The apparatus includes an inflatable vehicle occupant protection device that is inflatable into a position between the side structure of the vehicle and a vehicle occupant. The apparatus includes an inflator for inflating the inflatable vehicle occupant protection device and for maintaining the inflatable vehicle occupant protection device in an inflated condition for at least five seconds. The inflator contains a stored inflation fluid under pressure. The inflation fluid consists essentially of helium.

The present invention also comprises a stored gas inflator actuatable to inflate an inflatable vehicle occupant protection device for an extended period of time. The inflator includes a container means for containing inflation fluid under pressure. The inflation fluid consists essentially of helium. The container means has at least one openable portion for releasing inflation fluid to flow out of the container means. The inflator also includes first output means connected to the container means for directing the inflation fluid into the inflatable vehicle occupant protection device. The first output means releases the inflation fluid from the inflator at a relatively high rate over a relatively short period of time. The inflator also includes second output means connected to the container means for directing the inflation fluid into the inflatable vehicle occupant protection device. The second output means releases the inflation fluid from the inflator at a relatively low rate over a relatively long period of time. The relatively long period of time is at least five seconds.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is an enlarged view of a portion of the inflator of FIG. 2;

FIG. 4 is a view similar to FIG. 3 showing a rupturable closure member prior to inflation fluid entering a container which is closed by the closure member;

FIG. 5 is a view similar to FIG. 3 showing the closure member after an initiator of the inflator has been actuated;

FIG. 6 is a view similar to FIG. 5 showing a portion of the closure member sheared away;

FIG. 7 is a view similar to FIG. 6 showing the closure member during flow of inflation fluid from the container;

FIG. 8 is a longitudinal sectional view of an inflator according to a second embodiment of the present invention;

FIG. 9 is a view similar to FIG. 8 of an inflator according to a third embodiment of the present invention.

DESCRIPTION OF A PREFERRED EMBODIMENT

Figure 1:
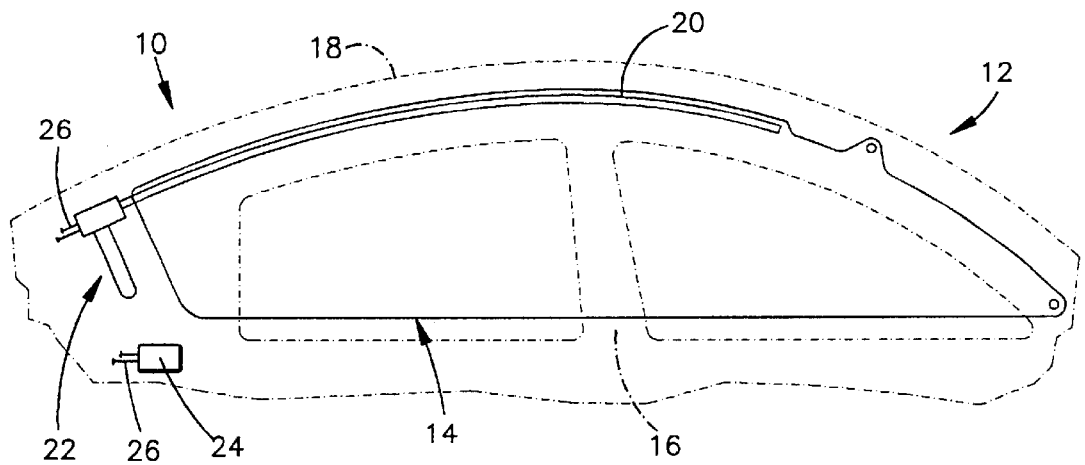
FIG. 1 is a schematic illustration of an apparatus for helping to protect an occupant of a vehicle, according to a first embodiment of the present invention.

The present invention relates to an apparatus for helping to protect an occupant of a vehicle. In particular, the present invention relates to an inflatable vehicle occupant protection device, such as a side curtain assembly, for helping to protect a vehicle occupant in the event of a side impact to a vehicle or a vehicle rollover. As representative of the present invention, FIG. 1 illustrates schematically an apparatus 10 for helping to protect an occupant of a vehicle 12.

The apparatus 10 includes an inflatable vehicle occupant protection device in the form of a side curtain 14. The side curtain 14 is mounted adjacent the side structure 16 and a roof 18 of the vehicle 12. A fill tube 20 extends into the side curtain 14. An actuatable inflator 22, when actuated, directs inflation fluid into the fill tube 20, which, in turn, directs inflation fluid into the side curtain 14 to inflate the curtain. The side curtain 14 is inflated from a deflated and stowed condition (not shown) to an inflated condition, as illustrated in FIG. 1. In its inflated condition, the side curtain 14 is positioned between the side structure 16 of the vehicle and a vehicle occupant.

The vehicle 12 includes a sensor 24, known in the art, for sensing a side impact to the vehicle and/or a vehicle rollover, to actuate the inflator 22. The sensor 24 may include vehicle electric circuitry for actuating the inflator 22 in response to sensing a side impact to the vehicle and/or a vehicle rollover. The sensor 24 provides an electric signal over lead wires 26 to the inflator 22, when the inflator is to be actuated.

Figure 2:
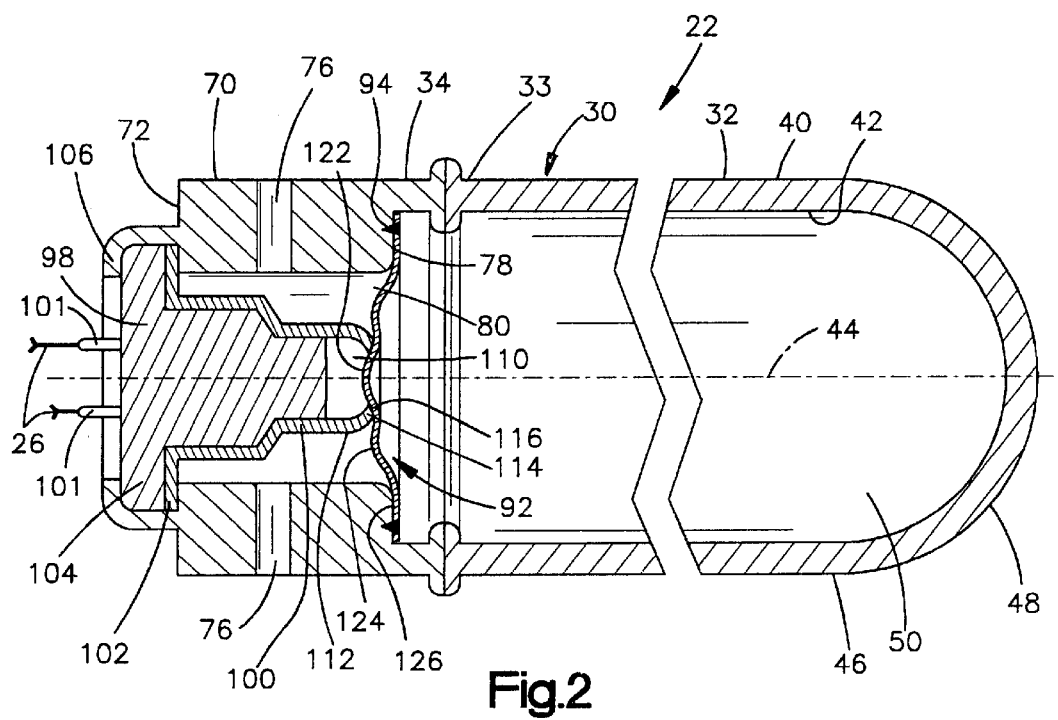
FIG. 2 is an enlarged sectional view of an inflator portion of the apparatus of FIG. 1.

The inflator 22 (FIG. 2) comprises a source of inflation fluid for the side curtain 14. The inflator 22 includes a container 30 having a generally elongate configuration including a main body portion 32 and an end cap 34. The end cap 34 is affixed to an open end 33 of the main body portion 32 by friction welding. The end cap 34 could, however, be connected to the main body portion 32 in any manner known in the art, such as using laser welds, brazing or screw threads.

The main body portion 32 of the container 30 has a tubular, cylindrical configuration including an axially extending cylindrical side wall 40. The side wall 40 has a cylindrical inner surface 42 centered on a longitudinal central axis 44 of the inflator 22. A second end portion 46 of the main body portion 32 is closed by a domed end wall 48. The side wall 40 and the end wall 48 partially define a chamber 50 in the container 30.

The chamber 50 contains pressurized inflation fluid. The inflation fluid stored in the chamber 50 consists essentially of helium at a storage pressure within the range of about 4,000 psi to about 7,000 psi. The use of helium as the inflation fluid facilitates the pressurization of the side curtain 14 upon inflation of the curtain. According to the present invention, due to the Joule-Thompson coefficient of throttling flow, the helium inflation fluid enters the side curtain 14 from the fill tube at a temperature below ambient conditions. Through heat transfer from the ambient surroundings, the temperature of the helium inflation fluid increases, which causes an increase in the pressure of the helium inflation fluid in the inflated side curtain 14. This helps to maintain the side curtain 14 in the inflated condition for a desired period of time. The desired period of time is at least five seconds, and preferably at least seven seconds.

The end cap 34 (FIGS. 2 and 3) of the container 30 has a generally cylindrical configuration including an axially extending cylindrical side wall 70 and an end surface 72. Inflation fluid outlet passages 76 are formed in an annular array in the side wall 70 of the end cap 34. The flow area, number and/or configuration of the outlet passages 76 may be selected to restrict or otherwise control the flow of the helium inflation fluid into the side curtain 14 through the fill tube 20. The fill tube 20 is connected in a known manner to the end cap 34, as illustrated schematically in FIG. 1.

The end cap 34 includes a surface 78 (FIG. 2) that extends generally parallel to the end surface 72. A passage 80 extends axially through the end cap 34 and intersects the surface 78. The passage 80 conducts the helium inflation fluid from the chamber 50 to the outlet passages 76. The passage 80 is centered on the axis 44.

A rupturable closure member 92 (FIGS. 2 and 3), such as a rupture disk, is affixed to the surface 78 by a laser weld 94. The rupture disk 92 could, however, be connected to the surface 78 in any manner well known in the art, such as by brazing, projection welding or electron beam welding. The rupture disk 92 is centered on the axis 44 and blocks the flow of the helium inflation fluid through the passage 80 and to the passages 76.

An initiator 98 centered on the axis 44 is housed in a hollow support 100, which supports the closure member 92. Lead wires 26 extend from connector pins 101 of the initiator 98 to receive the electrical signal from the sensor 24. The support 100 is centered on the axis 44. The support 100 (FIGS. 2 and 3) has a flange 102, which engages the end surface 72 of the end cap 34. The flange 102 extends radially outward of the support 100 and also engages a radially extending base 104 of the initiator 98.

An annular rim portion 106 extends from the end surface 72. The rim portion 106 initially projects axially away from the end surface 72 and is subsequently crimped around the base 104 of the initiator 98 to hold the initiator and the support 100 in place in the end cap 34. Alternatively, the initiator 98 and the support 100 may be welded to the end cap 34 to retain the initiator and the support in the end cap.

The support 100 projects inwardly along the axis 44 into abutment with the closure member 92. The support 100 is thus mounted in a load bearing relationship with the closure member 92. More specifically, the closure member 92 is subjected to the storage pressure of the helium inflation fluid in the chamber 50. Therefore, the closure member 92 transmits a fluid storage pressure force axially outward against the support 100. The support 100, in turn, transmits the storage pressure force to the end surface 72 of the end cap 34 where the initiator 98 adjoins the crimped rim 106 of the end surface 72.

The support 100 defines a chamber 110. An end portion 112 of the support 100 has a circular rim 114 engaging the closure member 92. The rim 114 defines an opening 116 into the chamber 110.

The closure member 92 has a central dome-shaped portion 122 extending into the chamber 110. A portion 124 of the closure member 92 encircles the dome-shaped portion 122. The portion 124 of the closure member 92 extends from the circular rim 114 of the support 100 to the surface 78 of the end cap 34. Another portion 126 of the closure member 92 encircles the portion 124 and is welded to the surface 78.

When the chamber 50 is not filled with the helium inflation fluid, as shown in FIG. 4, the closure member 92 is a flat disk. The closure member 92 is spaced from the rim 114 of the support 100. During the subsequent loading of the closure member 92 by the pressure of the helium inflation fluid, the closure member is stressed and undergoes plastic deformation into the chamber 110. The closure member 92 deforms from the flat disk shown in FIG. 4 into the shape shown in FIG. 3. A work hardening of the closure member 92 occurs during the plastic deformation.

Upon receiving of an electric signal from the sensor 24, the initiator 98 is actuated in a known manner to produce a shock wave and combustion gas. The pressure of the combustion gas, coupled with the shock wave, acts on the dome-shaped portion 122 of the closure member 92 to reverse the dome from the position shown in FIG. 3 to the position shown in FIG. 5.

The large movement of the dome 122 shears the dome out of the closure member 92, as shown in FIG. 6. The portion 124 of the closure member 92 around the dome 122 continues to block the passage 80. The pressure generated by the helium inflation fluid is supported only by the strength of the portion 124 when the dome 122 is removed. The pressure of the helium inflation fluid causes the portion 124 of the closure member 92 to rip and petal away from the support 100 to the position shown in FIG. 7. The ripping and petalling of the closure member 92 provides a flow of the helium inflation fluid through the passage 80 and to the outlet passages 76 and thereafter to the side curtain 14.

FIG. 8 illustrates an inflator 22a constructed in accordance with a second embodiment of the present invention. The inflator 22a of the second embodiment is similar in construction to the inflator 22 of the first embodiment (FIGS. 1–7) and can be used to inflate a side curtain (not shown in FIG. 8) similar to the side curtain 14 illustrated in FIG. 1. Parts of the inflator 22a (FIG. 8) that are similar or identical to the corresponding parts of the inflator 22 (FIGS. 1–7) are given the same reference numerals with the suffix "a" added for clarity.

The inflator 22a (FIG. 8) includes a container 30a having a generally elongate configuration. The container 30a includes a main body portion 32a and an end cap 34a. The end cap 34a is secured to the open end of the main body portion 32a by a friction weld, but could alternatively be secured by other known methods, such as laser welding, brazing, or screw threads.

The main body portion 32a of the container 30a has a tubular, cylindrical configuration including an axially extending, cylindrical side wall 40a centered on a longitudinal central axis 44a of the inflator 22a. The main body portion 32a also includes a domed end wall 48a.

The main body portion 32a and the end cap 34a define a chamber 50a in the container 30a. The chamber 50a contains a quantity of inflation fluid stored under pressure. The inflation fluid stored in the chamber 50a consists essentially of helium at a storage pressure that may be within the range of about 4,000 psi to about 7,000 psi.

A rupturable closure member 92a is secured to the end cap 34a and blocks flow of the helium inflation fluid out of the chamber 50a. The inflator 22a is free of pyrotechnic material for generating gas for inflating the side curtain. Only the helium inflation fluid is used to inflate the side curtain.

The end cap 34a of the container 30a has a generally cylindrical configuration that includes a cylindrical side wall 70a and an end portion 72a spaced from the chamber 50a. The side wall 70a has a cylindrical outer surface 200. The end cap 34a has a central chamber 202. An electrically actuatable initiator 98a of a known configuration is mounted on the end cap 34a and projects into the central chamber 202 of the end cap.

The inflator 22a includes a primary inflation fluid outlet passage 210 and a secondary or makeup inflation fluid outlet passage 230 for enabling flow of the helium inflation fluid from the central chamber 202 of the end cap 34a to the side curtain. The primary outlet passage 210 has a first portion 212 which extends radially from the central chamber 202 to the outer surface 200 of the side wall 70a of the end cap 34a. A second portion 214 of the primary outlet passage 210 extends perpendicularly from the first portion 212 to the outer surface 200. The second portion 214 extends in a direction into the plane of the paper as viewed in FIG. 8, and thus only its circular inlet is shown in FIG. 8.

A valve 220 is disposed in the first portion 212 of the primary outlet passage 210. The valve 220 includes a valve member 222, a spring 224, and a retainer 226. The retainer 226 is screwed into the end cap 34a at a radially outer end of the first portion 212 of the outlet passage 210. The spring 224 extends between the retainer 226 and the valve member 222. The spring 224 biases the valve member 222 into a closed position against a valve seat 228 formed on the end cap 34a adjacent the other end of the first portion 212 of the outlet passage 210. In other words, the valve member 222 is biased toward the central chamber 202 and in a downward direction as viewed in FIG. 8.

The valve member 222 is exposed to the fluid pressure in the central chamber 202 of the end cap 34a. When the valve member 222 is in the closed position, the valve 220 is in a closed condition blocking fluid flow from the central chamber 202 of the end cap 34a to the second portion 214 of the primary outlet passage 210.

The makeup outlet passage 230 is a continuously open passage which extends between the central chamber 202 and the outer side surface 200 of the end cap 34a. A radially inner first portion 232 of the makeup outlet passage 230 has a narrow, cylindrical configuration. A second portion 234 of the makeup outlet passage 230 extends radially outward from the first portion 232. The second portion 234 flares outwardly and has a larger flow area than the first portion 232.

The first portion 232 of the makeup outlet passage 230 has a relatively small flow area and thus significantly restricts fluid flow through the makeup outlet passage. The primary outlet passage 210, in comparison, has a relatively large flow area.

In the event of an impact to the vehicle of a magnitude greater than the predetermined threshold value, the initiator 98a is actuated in a known manner to rupture the closure member 92a. The helium inflation fluid flows out of the chamber 50a and into the central chamber 202 in the end cap 34a.

The helium inflation fluid immediately begins to flow out of the inflator 22a through the makeup outlet passage 230, which is always open. Inflation fluid flows through the primary outlet passage 210 only when the valve opens. Specifically, upon rupturing of the closure member 92a, the fluid pressure in the central chamber 202 of the end cap 34a, which acts on the valve member 222, increases rapidly until it overcomes the biasing effect of the valve spring 224. The valve member 222 moves off the valve seat 228, in an upward direction as viewed in FIG. 8.

When the valve member 222 moves far enough, the second portion 214 of the primary outlet passage 210 is connected in fluid communication with the central chamber 202 of the end cap 34a. The helium inflation fluid flows out of the end cap 34a through the first and second portions 212 and 214 of the primary outlet passage 210. Because of the relatively large flow area of the primary outlet passage 210, the helium inflation fluid flows through the primary outlet passage at a relatively high rate.

The flow of the helium inflation fluid through the primary outlet passage 210 lasts only as long as the fluid pressure in the central chamber 202 of the end cap 34a is sufficient to keep the valve 220 open. Specifically, as soon as the inflator 22a is actuated and the closure member 92a is ruptured, the pressure in the chamber 50a begins to drop. After a relatively short period of time, the pressure in the central chamber 202 drops to a low enough level that the valve spring 224 closes the valve 220. Flow of the helium inflation fluid through the primary outlet passage 210 ceases. Flow of the helium inflation fluid through the makeup outlet passage 230 continues throughout this time because the makeup outlet passage is continuously open.

The side curtain is inflated quickly because of the relatively high pressure and flow rate of the helium inflation fluid flowing through the primary outlet passage 210. This flow continues for a relatively short period of time, for example, about twenty milliseconds. This relatively short period of time is long enough to inflate the side curtain to help protect a vehicle occupant in the event of a side impact to the vehicle or a vehicle rollover.

After this initial rapid flow of the helium inflation fluid into the side curtain, the inflator 22a continues to supply the helium inflation fluid to the side curtain through the makeup outlet passage 230. This flow is at a relatively slow rate because of the relatively small effective flow area of the makeup outlet passage 230. The makeup outlet passage 230 discharges the helium inflation fluid only at a rate sufficient to compensate or make up for pressure loss in the side curtain through leakage or cooling. Thus, the pressure of the helium inflation fluid in the side curtain can be maintained at a desired relatively constant level, allowing the side curtain to remain filled for a desired period of time. The desired period of time is at least five seconds, and preferably at least seven seconds. The desired period of time is long enough to help prevent a vehicle occupant from being ejected from the vehicle during a side impact or vehicle rollover.

The flow area of the primary outlet passage 210 is about ten times or an order of magnitude greater than the effective flow area of the makeup outlet passage 230. The actual dimensions and relative sizes of the outlet passages 210 and 230 depend on numerous factors, including, but not limited to, the pressure at which the helium inflation fluid is stored, the volume of the side curtain, the required inflation rate and permeability of the side curtain, the required inflation pressure at first strike, and the required inflation pressure at a later time to prevent occupant ejection during a rollover accident.

FIG. 9 illustrates an inflator 22b constructed in accordance with a third embodiment of the present invention. The inflator 22b of the third embodiment is similar in construction to the inflator 22a of the second embodiment (FIG. 8) and can be used to inflate a side curtain (not shown in FIG. 9) similar to the side curtain 14 illustrated in FIG. 1. Parts of the inflator 22b (FIG. 9) that are similar or identical to the corresponding parts of the inflator 22a (FIG. 8) are given the same reference numerals with the suffix "b" added for clarity.

The inflator 22b includes a primary inflation fluid outlet passage 300 for enabling flow of inflation fluid from the inflator to the side curtain. The primary outlet passage 300 is a continuously open passage that extends between the central chamber 202b of the end cap 34b and the outer side surface 200b of the end cap. The flow area of the primary outlet passage 300 is large enough to fill the side curtain in a relatively short period of time, for example, about 20 milliseconds.

The inflator 22b also includes a makeup assembly 310 for providing a relatively slow flow of inflation fluid into the side curtain to compensate or make up for pressure loss in the side curtain over time. The makeup assembly 310 includes a secondary container 312. The secondary container 312 includes a main body portion 314 and an inner end portion 316. The inner end portion 316 has a central opening or passage 318.

A rupturable portion 320 of the secondary container 312, such as a closure member or foil membrane, is secured to the inner end portion 316 and closes the secondary container 312. A quantity of pressurized inflation fluid is stored in the secondary container 312. The inflation fluid stored in the secondary container 312 consists essentially of helium at a storage pressure that may be within the range of about 4,000 psi to about 7,000 psi.

The rupturable portion 320 blocks flow of the helium inflation fluid out of the secondary container 312 through the central opening 318 in the inner end portion 316 of the secondary container.

A threaded passage 322 is formed in the side wall 70b of the end cap 34b. The passage 322 extends radially from the central chamber 202b to the outer surface 200b of the side wall 70b of the end cap 34b. The inner end portion 316 of the secondary container 312 is screwed into the passage 322. The inner end portion 316 retains a spring 324 and a needle 326 in the passage 322.

The needle 326 is hollow and has an inflation fluid outlet passage 328 that extends for the entire length of the needle. A sharpened end portion 330 of the needle 326 is disposed in the central opening 318 of the inner end portion 316 of the secondary container 312, adjacent the rupturable portion 320 of the secondary container. Opposite the sharpened end portion 330, the needle 326 has an inner end portion 332 that is exposed to the fluid pressure in the central chamber 202b of the end cap 34b. The spring 324 biases the needle 326, against this fluid pressure, into a position spaced apart from the rupturable portion 320 of the secondary container 312.

Upon actuation of the inflator 22b, the initiator 98b is actuated and ruptures the closure member 92b. The helium inflation fluid flows out of the chamber 50b in the primary container 30b and into the central chamber 202b in the end cap 34b. The helium inflation fluid immediately begins to flow out of the inflator 22b through the primary outlet passage 300.

The pressure in the chamber 50b begins to drop as soon as the inflator 22b is actuated and the closure member 92b is ruptured. After a certain period of time, the pressure in the chamber 50b is low enough so that the primary container 30b is substantially emptied. Because of the relatively large flow area of the primary outlet passage 300, this typically takes only about twenty milliseconds. The side curtain can thus be inflated quickly because of the relatively high pressure and flow rate of the helium inflation fluid flowing from the primary container 30b.

In the meantime, the increased pressure in the central chamber 202b, acting on the needle 326, overcomes the biasing effect of the spring 324. The needle 326 moves into engagement with and ruptures the rupturable portion 320 of the secondary container 312. Helium inflation fluid flows out of the secondary container 312 through the outlet passage 328 in the needle 326 and into the central chamber 202b in the end cap 32b. The helium inflation fluid from the secondary container 312 mixes with the helium inflation fluid from the primary container 30b and flows out of the inflator 22b through the primary outlet passage 300.

Because of the relatively small flow area of the outlet passage 328 in the needle 326, the helium inflation fluid is discharged from the secondary container 312 at a relatively low rate. The secondary container 312 discharges the helium inflation fluid only at a rate sufficient to compensate for pressure loss in the side curtain over time through leakage or cooling. The volume and pressure of the helium inflation fluid are selected to provide this makeup flow to maintain the side curtain in an inflated condition for a desired period of time. The desired period of time is at least five seconds, and preferably at least seven seconds. Thus, the fluid pressure in the side curtain can be maintained at a desired relatively constant level, allowing the side curtain to remain filled for occupant protection for an extended period of time.

Figure 10:
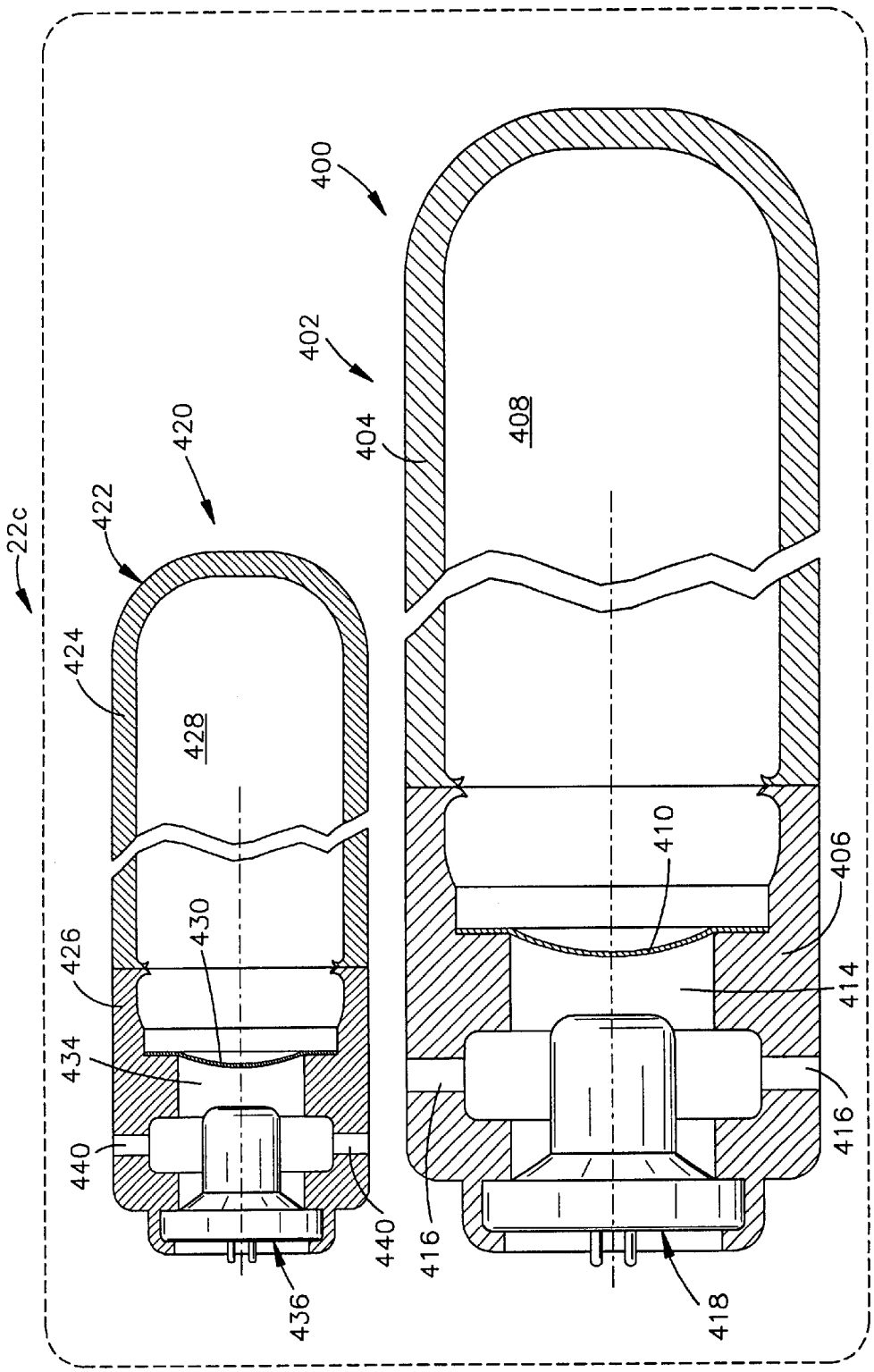
FIG. 10 is a view similar to FIG. 9 of an inflator according to a fourth embodiment of the present invention.

FIG. 10 illustrates an inflator 22c constructed in accordance with a fourth embodiment of the present invention. The inflator 22c of the fourth embodiment is similar in construction to the inflator 22b of the third embodiment (FIG. 9) and can be used to inflate a side curtain (not shown in FIG. 10) similar to the side curtain 14 illustrated in FIG. 1.

The inflator 22c includes a primary inflator 400 and a secondary inflator 420, which are identical except for fluid volume, pressure and output flow rate. The primary inflator 400 includes a container or housing 402, which has a main body portion 404 and an end cap 406. The inflator housing 402 defines a chamber 408, which is closed by a rupturable closure member 410. A quantity of pressurized inflation fluid is stored in the chamber 408. The inflation fluid stored in the chamber 408 consists essentially of helium at a storage pressure that may be within the range of about 4,000 psi to about 7,000 psi.

The end cap 406 has a central chamber 414. The closure member 410 blocks flow of inflation fluid from the chamber 408 into the central chamber 414. A plurality of outlet passages 416 in the end cap 406 enable flow of inflation fluid from the central chamber 414 when the closure member 410 is ruptured. Each one of the outlet passages 416 has a cylindrical configuration and is continuously open. An initiator 418 mounted on the end cap 406 projects into the central chamber 414 of the end cap.

The secondary inflator 420 includes a container or housing 422, which includes a main body portion 424 and an end cap 426. The inflator housing 422 defines a chamber 428, which is closed by a rupturable closure member 430. A quantity of pressurized inflation fluid is stored in the chamber 428. The inflation fluid stored in the chamber 428 consists essentially of helium at a storage pressure that may be within the range of about 4,000 psi to about 7,000 psi.

The end cap 426 has a central chamber 434. The closure member 430 blocks flow of inflation fluid from the chamber 428 into the central chamber 434. An initiator 436 mounted on the end cap 426 projects into the central chamber 434 of the end cap.

A plurality of outlet passages 440 are formed in the end cap 426 and enable flow of the helium inflation fluid from the central chamber 434. Each one of the outlet passages 440 has a cylindrical configuration and is continuously open. The combined flow area of the outlet passages 440 of the secondary inflator 420 is substantially less than the combined flow area of the outlet passages 416 of the primary inflator 400.

Upon actuation of the inflator 22c, the initiator 418 of the primary inflator 400 is actuated in a known manner and ruptures the closure member 410. The helium inflation fluid flows out of the chamber 408 and into the central chamber 414 in the end cap 406. The helium inflation fluid immediately begins to flow out of the primary inflator 400 through the outlet passages 416.

As soon as the primary inflator 400 is actuated and its closure member 410 is ruptured, the pressure in the chamber 408 begins to drop. After a certain period of time, the pressure is low enough so that the primary inflator 400 is substantially emptied. Because of the relatively large flow area of the outlet passages 416, this typically takes only about twenty milliseconds. The volume and pressure of the helium inflation fluid in the primary inflator 400 are selected to enable filling of the side curtain in this time period.

In the meantime, the secondary inflator 420 is actuated and begins to discharge the helium inflation fluid from the outlet passages 440. Because of the relatively small flow area of the outlet passages 440 in the secondary inflator 420, the helium inflation fluid is discharged from the secondary inflator at a relatively low rate. As a result, the helium inflation fluid flow from the secondary inflator 420 to the side curtain can persist for a desired period of time. The desired period of time is at least five seconds, and preferably at least seven seconds.

The side curtain is inflated quickly because of the relatively high pressure and flow rate of the helium inflation fluid flowing from the primary inflator 400. After this initial rapid flow of the helium inflation fluid into the side curtain, the assembly 22c continues to supply the helium inflation fluid from the secondary inflator 420 to the side curtain. The secondary inflator 420 discharges the helium inflation fluid only at a rate sufficient to compensate for pressure loss in the side curtain over time through leakage or cooling. Thus, the fluid pressure in the side curtain can be maintained at a desired relatively constant level, allowing the side curtain to remain filled for occupant protection for a desired period of time. The desired period of time is at least five seconds, and preferably at least seven seconds.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle that has a side structure, said apparatus comprising:
   an inflatable vehicle occupant protection device that is inflatable from a deflated and stowed condition into an inflated condition between the side structure of the vehicle and a vehicle occupant; and
   an inflator for providing inflation fluid to said inflatable vehicle occupant protection device to inflate said inflatable vehicle occupant protection device from said deflated stowed condition to said inflated condition and maintain said inflatable vehicle occupant protection device in said inflated condition for at least five seconds, said inflation fluid consisting essentially of helium stored under pressure.

2. Apparatus as defined in claim 1, wherein said inflator maintains said inflatable vehicle occupant protection device in said inflated condition for at least seven seconds.

3. Apparatus as defined in claim 2, wherein said inflator comprises:
   a container for storing said inflation fluid under pressure, said container having an outlet passage through which said inflation fluid flows from said container toward said inflatable vehicle occupant protection device;
   a rupturable closure member fixed to said container and blocking flow of said inflation fluid through said passage; and
   an initiator which, when actuated, causes said closure member to rupture to allow said inflation fluid to flow through said passage.

4. Apparatus as defined in claim 4, further comprising a support for supporting said closure member against the pressure of said inflation fluid in said container, said initiator, when actuated, rupturing said closure member and opening said passage to provide a flow of inflation fluid from said container through said passage.

5. Apparatus as defined in claim 4, wherein said initiator, when actuated, shears away a portion of said closure member to open said passage.

6. Apparatus as defined in claim 2, wherein said inflator comprises:
   container means for containing inflation fluid under pressure, said container means having at least one openable portion for releasing inflation fluid to flow out of said container means;
   first output means connected with said container means for releasing inflation fluid from said inflator at a relatively high rate over a relatively short period of time; and
   second output means connected with said container means for releasing inflation fluid from said inflator at a relatively low rate for a relatively long period of time.

7. An apparatus as set forth in claim 6 wherein said relatively long period of time is at least five seconds.

8. An apparatus as set forth in claim 6 wherein said relatively long period of time is at least seven seconds.

9. Apparatus as defined in claim 2 wherein said inflator comprises means for releasing fluid at a first predetermined flow rate for a first period of time and at a second predetermined flow rate for a second predetermined period of time, and wherein said second predetermined flow rate is selected to be a flow rate that is sufficient only to replace pressure lost through leakage from or cooling of said protection device.

10. Apparatus as defined in claim 2 wherein said inflator comprises a first container, an open primary inflation fluid outlet passage for providing inflation fluid from said first container at a high rate of flow to said protection device, and a makeup assembly for providing a relatively slow flow of inflation fluid into said inflatable vehicle occupant protection device.

11. An apparatus as set forth in claim 10 wherein said makeup assembly comprises a second container containing a quantity of inflation fluid separate from the inflation fluid in said first container.

12. An apparatus as set forth in claim 11 further comprising a movable member for opening said second container and for discharging inflation fluid from said second container.

13. Apparatus as defined in claim 2 wherein said inflator comprises a first stored gas inflator and a second stored gas inflator which have different output flow rates.

14. An apparatus as set forth in claim 13 wherein said first stored gas inflator comprises means for releasing fluid at a first predetermined flow rate for a first period of time and said second stored gas inflator comprises means for releasing fluid at a second predetermined flow rate for a second predetermined period of time, and wherein said second predetermined flow rate is selected to be a flow rate that is sufficient only to replace pressure lost through leakage from or cooling of said protection device.

15. Apparatus as defined in claim 1, further comprising a fill tube having a portion located in said inflatable vehicle occupant protection device, said fill tube delivering said inflation fluid to said inflatable vehicle occupant protection device to inflate said inflatable vehicle occupant protection device.

16. A stored gas inflator actuatable to inflate an inflatable vehicle occupant protection device for an extended period of time, said inflator comprising:

container means for containing inflation fluid under pressure, said inflation fluid consisting essentially of helium, said container means having at least one openable portion for releasing inflation fluid to flow out of said container means;

first output means connected to said container means for directing said inflation fluid into said inflatable vehicle occupant protection device, said first output means releasing said inflation fluid from said inflator at a relatively high rate over a relatively short period of time; and second output means connected to said container means for directing said inflation fluid into said inflatable vehicle occupant protection device, said second output means releasing said inflation fluid from said inflator at a relatively low rate over a relatively long period of time, said relatively long period of time being at least five seconds.

17. Apparatus as defined in claim 16, wherein said relatively long period of time is at least seven seconds.

18. An inflator as set forth in claim 16 wherein said first output means comprises a first outlet passage and a valve assembly for controlling fluid flow through said first outlet passage.

19. An inflator as set forth in claim 18 wherein said valve assembly is operable to enable fluid flow through said first outlet passage only when the pressure in said container means is above a predetermined pressure.

20. An inflator as set forth in claim 19 wherein said second output means comprises a second outlet passage that is continuously open.

21. An inflator as set forth in claim 16 wherein said second output means comprises a secondary source of inflation fluid.

22. An inflator as set forth in claim 21 wherein said second output means comprises a movable member for opening said secondary source of inflation fluid and for discharging fluid from said secondary source of inflation fluid.

23. An inflator as set forth in claim 16 wherein said container means comprises first and second containers of inflation fluid.

* * * * *